United States Patent [19]
Wolf

[11] Patent Number: 4,711,717
[45] Date of Patent: Dec. 8, 1987

[54] FILTER CARTRIDGE FOR FLUIDS

[76] Inventor: Joachim Wolf, Malmsheimer Strasse 67, 7252 Weil der Stadt, Fed. Rep. of Germany

[21] Appl. No.: 853,426

[22] Filed: Apr. 18, 1986

[30] Foreign Application Priority Data

Jun. 5, 1985 [DE] Fed. Rep. of Germany ....... 3520139

[51] Int. Cl.[4] ............................................ B01D 27/08
[52] U.S. Cl. ..................................... 210/137; 210/232; 210/323.2; 210/443; 210/450; 55/429
[58] Field of Search ............... 210/232, 249, 357, 440, 210/441, 443, 444, 452, 456, 483, 497.01, 450, 137, 323.1, 323.2; 137/315; 55/366, 428, 429, 432

[56] References Cited

U.S. PATENT DOCUMENTS

| | | | |
|---|---|---|---|
| 4,320,005 | 3/1982 | DeGrafferreid | 210/232 |
| 4,452,695 | 6/1984 | Schmidt | 210/232 |
| 4,452,697 | 6/1984 | Conrad | 210/440 |
| 4,454,036 | 6/1984 | Suzuki | 210/440 |

OTHER PUBLICATIONS

"Industrial Filters", AMF Deutschland GmbH, Curo Filter, Catalog Number G120.5G.

*Primary Examiner*—Richard V. Fisher
*Assistant Examiner*—Wanda L. Millard

[57] ABSTRACT

A filter device for media, such as air and liquids, has a filter cartridge which has an inflow surface and a flow-off surface, a disk-shaped adaptor located at one end of the filter cartridge, at least one first orifice for the inflowing unfiltered medium, at least one second orifice for the flowing-off filtered medium, a filter bowl which has a side wall and a bottom region, and a sealing device between the adaptor and the free end region of the side wall. A media-proof hose is connected in a sealed manner by means of one end region to a face of the adaptor which is at least adjacent to the edge region of the side wall of the filter bowl. The hose, at least over part of its length, receives the filter cartridge. The second end region of the hose is closed at least during the operation of the filter device. The hose material has such strength that, when detached from the filter bowl and filter cartridge, it does not tear despite the filtrate and medium contained in the hose.

19 Claims, 7 Drawing Figures

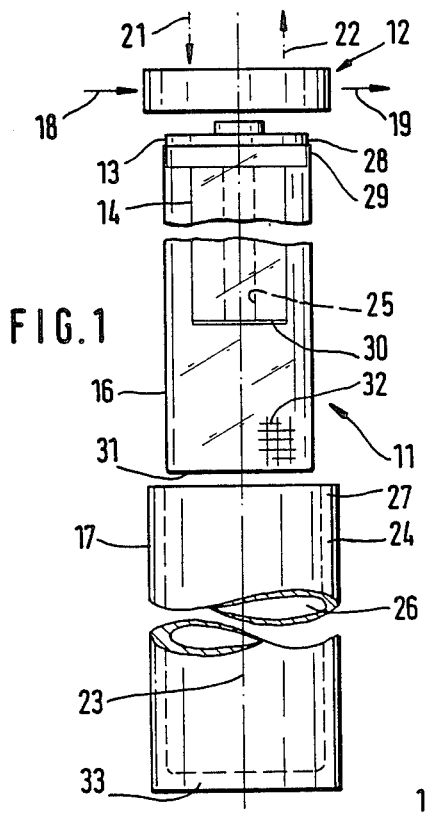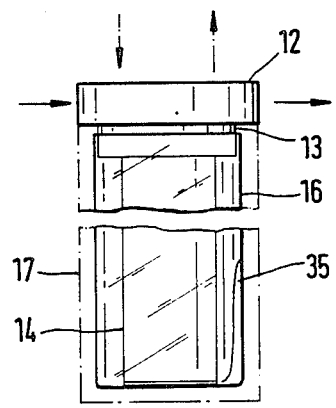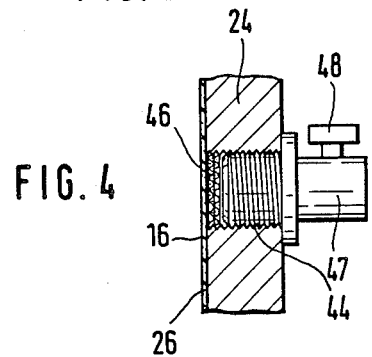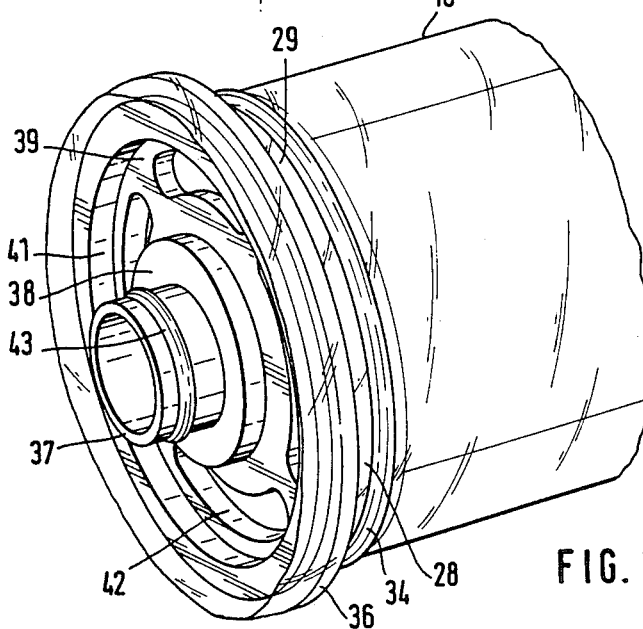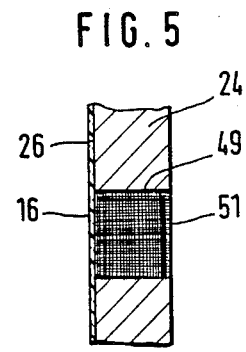

FILTER CARTRIDGE FOR FLUIDS

The invention relates to a filter device, and more particularly to a filter device for media, such as air and liquids, having: a filter cartridge with an inflow surface and a flow-off surface; a filter bowl having a side wall with a free end region and a bottom region; a disk-shaped adaptor located at one end of the filter cartridge, having an adaptor face adjacent to the free edge region of the side wall of the filter bowl, at least one first orifice for inflowing unfiltered medium, and at least one second orifice for flowing-off filtered medium; and a sealing device between the adaptor and the free end region of the side wall of the filter bowl.

BACKGROUND OF THE INVENTION

Such devices are used for laboratory filters and technical and industrial filters. They have lengths of a few centimeters up to approximately one meter. The media can be air or liquids. They are used in the production of pharmaceutical products, food products, high-purity water, dielectric oil, chemicals, cosmetics, solvents, electroplating solutions, resins, fats and oils, radioactive waste, paints and varnishes, inks, air and gas, steam, acids, liquified gases, syrup, cellulose solutions, hydraulic oils, polymers, adhesives, resins, lubricants, fuels, lubricating oils, untreated water, condensation returns, light oils and service water.

Depending on the particular use, the filter finenesses can be in the range of 1 to 500 microns.

In approximately 80% of cases, the outer face of the filter cartridge is the inflow surface, and the inner face forms the flow-off surface.

In the remaining cases, the flow passes through the filter cartridge from the inside outwards, for example in the filtering of compressed air. Here, the water then runs off on the outer face of the filter cartridge. If the flow passes through from the inside outwards, the filter cartridge can also have the form of a filter bag which is inserted in a metal cartridge having wall perforations. Filter devices of this type, but usually without the disk-shaped adaptor, are described, for example, in the cataglog G120.5 G entitled "Industrial Filters" of Messrs. AMF Deutschland GmbH, Cuno Filter, 6200 Weisbaden, Konradinstrasse. The disk-shaped adaptor mentioned at the beginning of this specification is used in cases where the filter cartridges are closed at their free end. The adaptor then retains the filter cartridges and has the necessary orifices so that the medium can flow in on one side and flow off on the other side.

The filter device usually has a head which can be detached from the adaptor. However, it is also possible for the adaptor to be in one piece with the head.

Depending on the particular use, the known filter devices can have the following disadvantages:

a. For example in the filtration of domestic water and even more so in sterile filtration, the filter cartridges should not be touched by hand. For example, the pressure on the surface of beer in beer storage vessels is of course generated by pure compressed air. But sterility also plays an important part in the pharmaceutical industry, food production, etc. Although manufacturers enclose plastic gloves with their deliveries so that the filter cartridges supplied sterile remain sterile, nevertheless it is annoying to have to put on plastic gloves. But even if plastic gloves are worn, the filter cartridges still come in contact with the impure ambient air.

b. During filtration, filtrate settles on the inflow surface in the course of time. Consequently, the filter cartidges eventually become worn out.

Now when the filter cartridges are changed, it is never possible to prevent filtrate from falling into the bowl from the filter cartridges. The filter bowl then has to be washed. It is also necessary to wash the filter cartridge if this is to be re-used or if it cannot be discarded along with the filtrate adhering to it.

The adaptor will also have to be washed at the same time. It is almost always necessary to wash the filter head too, because filtrate can also penetrate into this.

This washing process is extremely unpleasant. Solvent is usually needed for it. This means that large volumes of solvent are present and that the persons employed in washing have to wear breathing masks. Waste disposal is very difficult here.

c. The filter bowls not only have to withstand pressure, but must also withstand attack by the media. This means that it is not only necessary to select the materials for the filter bowls according to the pressure anticipated, but that special materials are frequently required for this purpose. For example, seawater-proof special steel is necessary if seawater is to be filtered. The same of course applies to acids, lyes, or other more or less aggressive media.

d. It is sometimes desirable to recover materials such as, for example, metals or precious metals, from the concentrated filtrate. These materials have indeed per se settled on the filter cartridge in a high concentration. However, when the latter is exchanged, it is impossible to prevent at least some of the filtrate from floating, plopping or otherwise passing back into the filter bowl, so that the materials have to be concentrated once more.

e. As regards those materials classed as dangerous, such as, for example, radioactive materials, the filter bowl comes in contact with these and also has to be discarded.

f. Because the exchange lasts a long time, washing takes a long time and a great amount of time is taken up in further work, there is a long outage time. This means that filter systems have to be oversized if they have to operate continuously.

OBJECT AND STATEMENT OF THE INVENTION

The object of the invention is to provide a solution in which, depending on the particular use, the above-mentioned disadvantages are avoided. At the same time, the solution should be cheap. It should not necessitate revised thinking. It should be possible to preserve in principle the system which has existed hitherto, that is to say there should be no need for a new type of filter cartridge. The solution should also be simple and therefore inexpensive.

According to the invention, this object is achieved by means of a media-proof hose having a first end region connected in a sealed manner to the adaptor face and a second end region that is closed at least during the operation of the filter device; the hose being arranged and adapted to receive the filter cartridge at least over part of its length; the hose being comprised of material of adequate strength to be detached from the filter bowl and the filter cartridge without tearing, with filtrate and media contained in the hose.

As a consequence of this, the filtrate never comes in contact with the filter bowl, and the latter therefore need only be designed according to its mechanical stress and there is also no need to pay attention to its chemical properties. The time required for the exchange is less by more than the factor 10. The costs are minimal, because such hose material is already available and usually the hose itself is already a mass-produced product. Even in cases where the inflow surface is on the inside of the filter cartridge, the invention proves appropriate: for example, in the filtering of compressed air, the water runs off on the outside of the filter cartridge and remains in the hose.

Advantageously, the invention includes the following additional features:

The first end region of the hose is integral with the adaptor. The feature ensures that there is an absolutely leak-proof connection between the adaptor and the hose.

A sealing ring on the adaptor face is arranged and adapted to connect the hose to the adaptor and to retain the free end region of the side wall of the filter bowl to the adaptor. As a result of this feature, a particularly simple connection is obtained, because the sealing ring not only seals off, but also grips and retains the hose. In this way, a plurality of filter devices can be "converted" without any additional technical outlay. However, the sealing ring must have enough holding force to retain the hose reliably when the content of the latter is heavy.

The hose has a region corresponding at least to the length of the filter cartridge, which region has an outer circumference that is larger than the inner circumference of the filter bowl. This feature ensures that, irrespective of the internal pressure, the hose nowhere has to absorb peripheral stresses, and this means that it can be made thinner with the certainty that the hose material will not yield under the continuous pressure.

The hose is at least of a length such that the second end region rests on the bottom region of the filter bowl when the filter device is in a pressureless state. The feature ensures that there are also no longitudinal forces in the hose. By the "second end region" is meant the effective end region, irrespective of whether the hose otherwise extends even further in any way.

As a result of the combination of the features in the preceding two paragraphs, the hose can be made of a very thin film which can be paper-thin. It can then consist, for example, of PVC, polyethylene, polypropylene or the like.

The hose is substantially longer than the filter cartridge. The feature ensures that the effective second end region rests securely on the bottom region. Moreover, it is then possible to extract the filter cartridge, together with the adaptor and hose, more easily: the adaptor, together with the filter cartridge and the upper hose region, is first taken in the hand (with the filter bowl fixed), and then the hose region filled with the filtrate can be extracted separately. If the filter head is fixed and the filter bowl has to be unscrewed, the opposite applies.

The second end region of the hose is integrally and permanently closed. This feature ensures that this end region always remains closed. However, this end region could also be closed in the manner of a bag top by means of a band, clip or the like. But it could also be left completely open and, if the hose material is thin film, allowed to project open above the bowl edge. It would then be sealed off by the sealing device. However, during extraction, it would be necessary to make sure that the hose remained closed.

The hose is comprised of an at least translucent material. As a result of this feature, it is possible to see what is happening in the region of the filter cartridge from outside. For example, it is possible to see how much filtrate has been deposited, what the color is, etc. This feature is useful particularly in connection with filter bowls made of glass (organic or inorganic glass).

The hose has reinforcing inserts. This feature makes it impossible for the hose to be torn. This could happen especially if the filtrate is heavy, if the filter is large, and even if the hose is just long enough to rest on the bottom region of the filter bowl.

The hose has an outer face and the side wall of the filter bowl has an inner surface and a pressure-compensating device for the volume is between the outer face of the hose and the inner surface of the side wall of the filter bowl. These features prevent an air cushion from forming between the outer face of the hose and the inner wall of the bowl. This could subject thin hose material to excessive stress. However, if the hose material has sufficient resistance to stress, the air cushion which forms without the pressure-compensating device could also be used to reduce pressure peaks in the medium.

The pressure-compensating device is provided in the region of the filter bowl side wall. The feature makes it possible to avoid attaching the pressure-compensating device to the hose, so that a very simple circular-cylindrical hose can still be used.

The pressure-compensating device comprises a valve on the filter bowl side wall. The feature makes it possible not only to carry out pressure compensation, but also, for safety reasons, to make the bowl wall medium-proof again by switching off the valve.

The pressure-compensating device comprises a porous piece in the filter bowl side wall. This feature ensures that pressure compensation still takes place, if, for example, the valve has inadvertently not been opened, or if air cushions can still form subsequently, or if pressure differences arise. Although the porous piece allows air to flow in and out, it nevertheless provides further support for the unstable hose.

The hose comprises a thin tube with a bottom. As a result of this feature, a more stable hose in the form of a pot is obtained. However, this hose must then fit exactly into the filter bowl.

The filter device has an inflow region and the adaptor face connected to the first end region of the hose is adjacent to the inflow region. The features are recommended for cases where the outer face of the filter cartridge is the inflow surface.

The filter bowl has a circular-cylindrical inner face that is coaxial with the filter device. As a result of this feature, previous filter bowls can continue to be used. Above all, this ensures that the hose rests uniformly in the filter bowl. If the filter bowl had corners, such as, for example, rectangular corners, there would be the danger that the hose would be overstretched in these corners.

When a plurality of filter cartridges are used, the filter bowl has a side wall that extends in the form of an arcade to correspond to the filter cartridges. This feature is recommended for cases where, in order to save space, the side wall of the filter bowl matches the contour of the filter cartridges. Here again, the danger of the hose being overstretched is avoided because of the arcade shape.

The filter cartridge has a circular-cylindrical contour. The feature ensures that the known filter cartridges can continue to be used. When the hose is extracted, the circular-cylindrical faces then rest against the hose, and this does not subject the latter to such high stress as it would if the filter cartridges had sharp edges. The hose could tear as a result if it were thin like a film.

A plurality of individual filter cartridges are arranged in a coaxially circular-cylindrical arrangement. This feature ensures that the distance between the outer face of the filter cartridge and the hose is the same everywhere.

DESCRIPTION OF THE DRAWINGS

Preferred exemplary embodiments of the invention are described below. In the drawings:

FIG. 1 shows a side view of a filter device in a partially exploded and truncated representation.

FIG. 2 shows a representation similar to that of FIG. 1, but in the assembled state.

FIG. 3 shows a perspective view of the adaptor, the film hose fastened to it (partially) and the filter cartridge (partially).

FIG. 4 shows a partial section through a filter bowl wall with a pressure-compensating valve.

FIG. 5 shows a partial section through a filter wall with an inserted porous piece.

DETAILED DESCRIPTION

Figure 6:
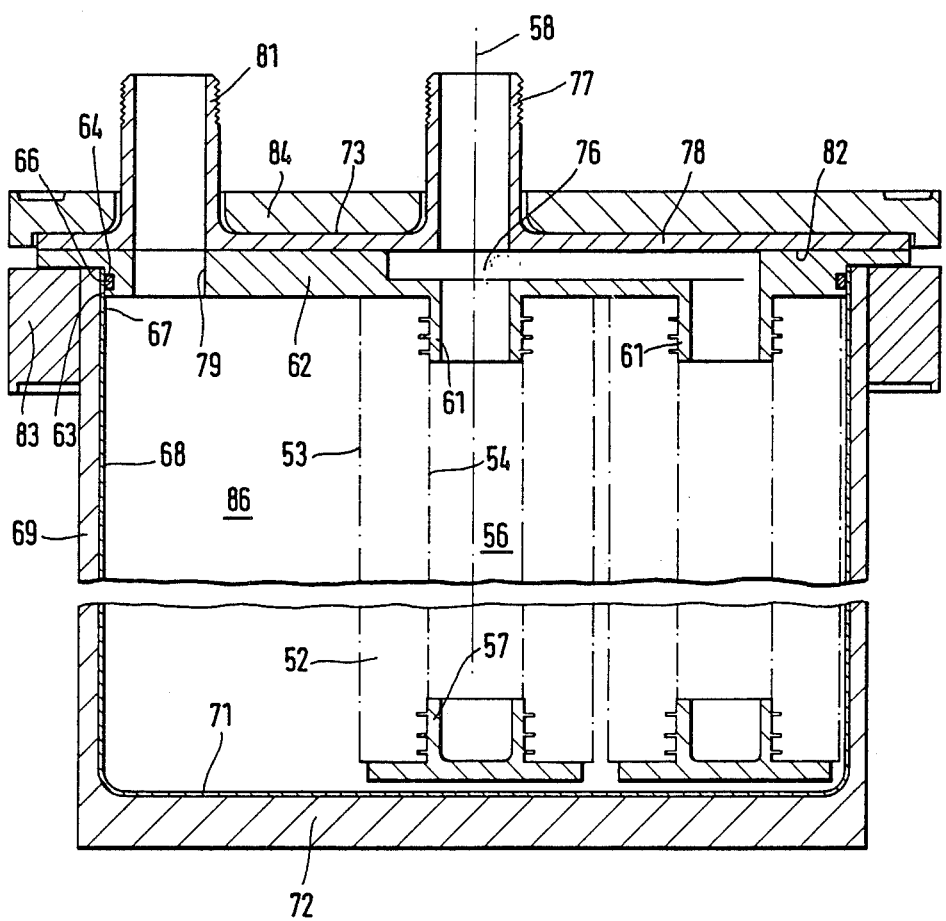
FIG. 6 shows a radial section through a filter device with several filter cartridges.

A filter device 11 comprises essentially a head 12, an adaptor 13, a cartridge 14, a hose 16 and a bowl 17. The head 12 serves conventionally for fastening the filter device 11, whether a holder is provided when the inflow and outflow lines are flexible or whether the head 12 is held by being screwed to rigid lines, etc.

At the head 12, the medium can be supplied horizontally according to the arrow 18 in a connection piece (not shown) and can be discharged horizontally according to arrow 19. There are also heads 12 in which the medium is supplied vertically according to the arrow 21 and also discharged vertically according to the arrow 22. The bowl 17 is essentially rotationally symmetrical and coaxial relative to a geometrical longitudinal axis 23. It has a side wall 24 having an inner face 26 and an upper edge region 27. During operation, means of connecting the bowl 17 to the head 12 in a medium-proof manner are provided in the upper edge region 27. These can be a thread and a screw ring or nuts with a threaded bolt, or the edge region 27 can be screwed to the head 12. Various technical possibilities can be found in the catalog mentioned in the Background of the Invention. In this fastening, the adaptor 13 is also pressed against the head 12 from below, specifically likewise in a media-proof manner and in such a position that the perforations provided in it and yet to be discussed are correctly aligned with the laden medium supplied and the purified medium discharged. The adaptor 13 is essentially rotationally symmetrical, with the exception of its perforations, inasmuch as these are not coaxial. It has an annular outer face 28, which, in the assembled state, is adjacent to the edge 27.

The cartridge 14 is attached to the bottom of the adaptor 13. It has a coaxial central circular-cylindrical bore 25 closed at the bottom by means of a cover 30. The cartridge 14 is fastened by means of its upper end face to the adaptor 13 rigidly and in the correct position. This fastening can be carried out by means of adhesive bonding and can be unreleasable. However, it can also be detachable so that, when high quality adaptor material is used, the cartridge can be separated from the adaptor 13 at a later date.

The upper first end region 29 of the hose 16 is retained on the outer face 28 in a way which will be explained later. In the lower end region 31, the hose 16 is closed so as to be media-proof by means of a welded seam. It consists of a film which can be a few hundredths to a few tenths of a millimeter thick. It is transparent and colorless and can have a fiber mesh 32 for reinforcement, as shown on the hose 16 on the bottom right in FIG. 1.

As can be seen from FIG. 1, the hose 16 is substantially longer than the cartridge 14. In the assembled state according to FIG. 2, approximately the lower third of the hose 16 can therefore ride upwards again in the bowl 17 in the manner of a bag top 35, if the hose 16 has been placed upwards in the lower half before assembly. If this part of the hose 16 is not placed upwards, the hose 16 is creased on the top side of the bottom 33 of the bowl 17. However, since it is highly flexible in the manner of films, it matches the contour of the inside of the bottom 33.

According to FIG. 3 which shows the adaptor 13 in more detail, the latter has a coaxial circular-cylindrical outer face 28, in which a coaxial and continuous semi-annular groove is made. An O-ring 34 rests in this semi-annular groove under a certain prestress. The first end region 29 of the hose 16 is gripped between the inside of the O-ring 34 and the annular groove. In the assembled state, the O-ring 34 makes a seal against the inside of the edge region 27 of the bowl 17. Since this presses the O-ring 34 into its groove even more, the end region 29 is retained even better. According to FIG. 3, there projects at right angles, on the left of the outer face 28, an annual coaxial rib 36 which, in the assembled state, rests on the upper end face of the side wall 24 under the pressure of a bracing device (not shown). According to FIG. 3, the first end region 29 of the hose 16 is drawn until it also projects beyond this rib 36. The adaptor 13 is of conventional design. Accordingly, it has a coaxial connection piece 37 which projects on the left in FIG. 3 and which is aligned with the bore in the cartridge 14. Spokes 39 extend from the coaxial central hub ring 38 and on the outside merge into an outer ring 41 which on its outer face has the shape described above. Thus, kidney-shaped holes 42 are obtained between the hub ring 38, the spokes 39 and the outer ring 41 and communicate with the space between the outer face of the cartridge 14 and the inner face of the hose 16.

In contrast to the customary design of the adaptor 13, the latter has on the outside of the connection piece 37 a continuous coaxial annular groove, in which an O-ring 43 is located.

When the head 12 is connected to the bowl 17, the connection piece 37 penetrates into a corresponding line for the medium supplied according to the arrows 18 or 21. On the other hand, the holes 42 communicate with a cavity, from which the purified medium flows according to the arrows 19 or 22.

So that no permanent air cushion forms between the hose 16 and the inner face of the bowl 17, according to FIG. 4, the side wall 24 has a threaded bore 44. On the left towards the hose 16, this is covered by a very finemesh netting 46, so that the hose 16 cannot be pressed into the threaded bore 44 there and stretched. A valve 47 is screwed into the threaded bore 44 and can be closed or opened by means of a T-handle 48. According to a further exemplary embodiment, the side wall 24 has a bore into which is glued rigidly a porous insert 51 which, in the region of the hose 16 located above the bore 49, both exerts a supporting effect and allows the air to escape. It is very important to ensure that the entire inner face of the bowl 17 is very smooth and has no thora-like spikes or sharp edges, because these would puncture a hose 16 made of very thin film. The thicker the film of the hose 16, the rougher the inside of the bowl 17 can be machined. Where the bore 49 and the threaded bore 44 are concerned, this means that there must be a very smooth transition to the inner face 26 in the inner corner regions.

The reason for the additional O-ring 43 according to FIG. 3 is that the adaptor 13 can be drawn off from the head 12 as a whole.

It is also possible, however, for the adaptor 13 to be formed as part of the head 12, so that these form a unit and remain a unit on the way to being recycled or when thrown away.

Figure 7:
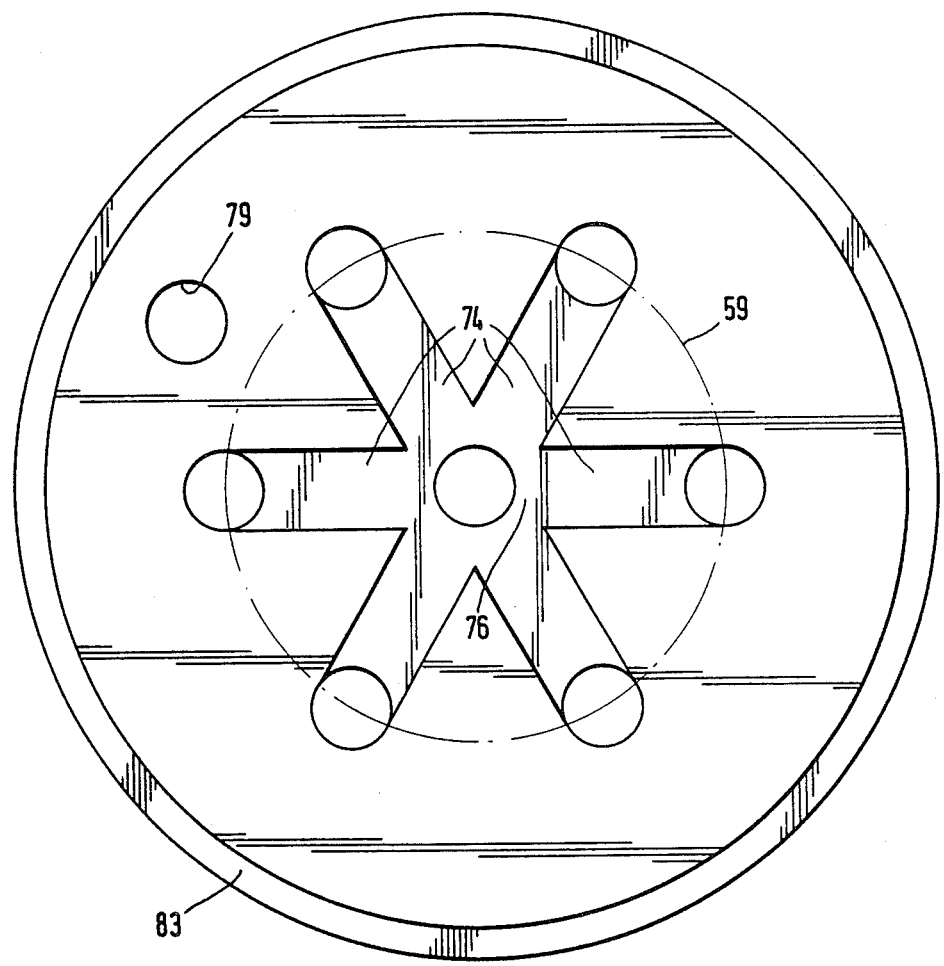
FIG. 7 shows a plan view of one-half of the adaptor of FIG. 6.

The exemplary embodiment according to FIGS. 6 and 7 shows that the invention can also be used for filter devices which have several filter cartridges. Here, there are seven identical filter cartridges 52 which have an inflow surface 53 and a flow-off surface 54. The flow-off surface 54 corresponds to the bore 56. This is closed at the bottom by means of a cover 57 which has the customary design in these cases. The innermost cartridge 52 is coaxial relative to the geometrical longitudinal axis 58, whilst the other cartridges are located on a circle 59. All the cartridges 52 are retained in their upper region by downward-projecting connection pieces 61 of an adaptor 62 which, here again, has an essentially disk-shaped form. In its outer face 63, there is a coaxial continuous groove 64, in which an O-ring 66 is located. In its upper edge region 67, a very thin coaxial tube 68 is gripped between the O-ring 66 and the groove 64. The tube 68 fits exactly inside the bowl 69, and a bottom 71 rests without mechanical stresses on the topside of the bottom 72 of the bowl 69.

On the adaptor 62, radial depressions 74 extend inwards from its top side 73, so that the connection pieces 61 can all communicate with one another. A discharge connection piece 77 of the head 78 is in line with the central region 76 of these depressions 74. The discharge connection piece 77 is arranged coaxially, and it corresponds in functional terms to the arrow 22. In the adaptor 62, a through hole 79 is provided in the outer region, but within the groove 64. A feed connection piece 81 of the head 78 is in line with this through hole 79. This corresponds in functional terms to the arrow 21.

The underside 82 of the head 78 is plane and therefore ensures sealing relative to the otherwise plane top side of the head 78.

A tension ring 83 is provided at the top and on the outside of the bowl 69. A clamping plate 84 with perforations for the discharge connection piece 77 and the feed connection piece 81 is provided on top of the head 79. When the tension ring 83 and the clamping plate 84 are braced vertically relative to one another by means (not shown), according to FIG. 6, the bowl 79 is moved upwards and the head 78 held sealed relative to the adaptor 62. Consequently, any medium located within the volume 86 nowhere penetrates to the inner faces of the bowl 79.

I claim:

1. A filter device for fluid media, comprising:
   a filter cartriddge with an inflow surface and a flow-off surface;
   a filter bowl having a side wall with a free end region and a bottom region;
   a disk-shaped adaptor located at one end of said filter cartridge, having an adapter face adjacent to said free end region of said side wall of said filter bowl, means defining at lest one first orifice for inflowing unfiltered medium, and means defining at least one second orifice for flowing-off filtered medium;
   a sealing device between said adaptor and said free end region of said side wall of said filter bowl; and
   a media-proof hose having a first end region connected in a sealed manner to said adaptor face and a second end region that is closed at least during the operation of the filter device;
   said hose being arranged and adapted to receive said filter cartridge at least over part of its length;
   said hose being comprised of material of adequate strength to be detached from said bowl and said filter cartridge without tearing, with filtrate and media contained in said hose.

2. A filter device as claimed in claim 1, wherein said first end region of said hose is integral with said adaptor.

3. A filter device as claimed in claim 1, comprising a sealing ring on said adaptor face arranged and adapted to connect said hose to said adaptor and to retain said free end region of said side wall of said filter bowl to said adaptor.

4. A filter device as claimed in claim 1, wherein said hose has a region corresponding at least to the length of said filter cartridge, which region has an outer circumference that is larger than the inner circumference of said filter bowl.

5. A filter device as claimed in claim 1, wherein said hose is at least of a length such that said second end region rests on said bottom region of said filter bowl when the said filter device is in a pressureless state.

6. A filter device as claimed in claim 1, wherein said hose is substantially longer than said filter cartridge.

7. A filter device as claimed in claim 1, wherein said second end region of the said hose is integrally and permanently closed.

8. A filter device as claimed in claim 1, wherein said hose is comprised of an at least translucent material.

9. A filter device as claimed in claim 1, wherein said hose has reinforcing inserts.

10. A filter device as claimed in claim 1, wherein said hose has an outer face and said side wall of said filter bowl ha an inner surface, comprising a pressure-compensating device for the volume between said outer face of said hose and said inner surface of said side wall of said filter bowl.

11. A filter device as claimed in claim 10, wherein said pressure-compensating device is provided in the region of said filter bowl side wall.

12. A filter device as claimed in claim 11, wherein said pressure-compensating device comprises a valve on said filter bowl side wall.

13. A filter device as claimed in claim 11, wherein said pressure-compensating device comprises a porous piece in said filter bowl side wall.

14. A filter device as claimed in claim 1, wherein said hose comprises a thin tube with a bottom.

15. A filter device as claimed in claim 1, wherein said filter device has an inflow region and said adaptor face connected to said first end region of said hose is adjacent to said inflow region.

16. A filter device as claimed in claim 1, wherein said filter bowl has a circular cylindrical inner face that is coaxial with said filter device.

17. A filter device as claimed in claim 1, comprising a plurality of filter cartridges, wherein said filter bowl has a side wall that extends in the form of an arcade to correspond to said filter cartridges.

18. A filter device as claimed in claim 1, wherein said filter cartridge has a circular-cylindrical contour.

19. A filter device as claimed in claim 1, comprising a plurality of individual filter cartridges arranged in a coaxially circular-cylindrical arrangement.

* * * * *